United States Patent
Velusamy et al.

(10) Patent No.: US 9,554,311 B1
(45) Date of Patent: Jan. 24, 2017

(54) RESOURCE MANAGEMENT IN FIRST NETWORK BASED ON SERVICE WITHIN SECOND NETWORK

(71) Applicant: Sprint Spectrum L.P., Overland Park, KS (US)

(72) Inventors: Saravana Velusamy, Olathe, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 46 days.

(21) Appl. No.: 13/969,118

(22) Filed: Aug. 16, 2013

(51) Int. Cl.
*H04W 36/00* (2009.01)

(52) U.S. Cl.
CPC ................................ *H04W 36/0083* (2013.01)

(58) Field of Classification Search
CPC .................................................. H04W 36/0083
See application file for complete search history.

(56) References Cited

U.S. PATENT DOCUMENTS

| | | | | |
|---|---|---|---|---|
| 2003/0139184 A1* | 7/2003 | Singh | ............... | H04W 36/0066 455/436 |
| 2004/0033805 A1* | 2/2004 | Verma | ............... | H04W 36/0066 455/444 |
| 2008/0076434 A1* | 3/2008 | Shigaki | ................ | H04W 36/08 455/442 |
| 2012/0218889 A1* | 8/2012 | Watfa et al. | .................. | 370/230 |
| 2013/0021929 A1* | 1/2013 | Kim | .............................. | 370/252 |
| 2013/0029698 A1* | 1/2013 | Higashide | ..................... | 455/466 |
| 2013/0107863 A1* | 5/2013 | Faccin et al. | ................. | 370/331 |
| 2014/0220985 A1* | 8/2014 | Lin | ............................... | 455/444 |
| 2014/0247730 A1* | 9/2014 | Thota et al. | ................... | 370/252 |
| 2014/0370897 A1* | 12/2014 | Vesterinen | ............ | H04W 36/08 455/436 |
| 2015/0131615 A1* | 5/2015 | Miklos | .............. | H04W 36/0055 370/331 |

OTHER PUBLICATIONS

Machine translation of KR 20140021196 to Choi.*
"An overview of vertical handover decision strategies in heterogeneous wireless networks," Computer Communications 31 (2008) 2607-2620, Meriem Kassar, Brigitte Kervella, Guy Pujolle.*

* cited by examiner

*Primary Examiner* — Vladimir Magloire
*Assistant Examiner* — David Orange (57) ABSTRACT

A method and corresponding system to help manage resources in a wireless communication system. When a first access network has allocated a resource for use in serving a UE and the UE has then transitioned from being served by the first access network to being served by a second access network, a determination may be made that (i) the UE has then moved into particular coverage of the second access network and (ii) the first access network does not have a coverage area that corresponds with that particular coverage area of the second access network. In response, the first access network may then release the resource that it had allocated for use in serving the UE. In a scenario where the first access is configured to normally release the resource upon expiration of a resource-release timer, the release in response to the determination may advantageously occur before the timer expires.

17 Claims, 5 Drawing Sheets

RESOURCE MANAGEMENT IN FIRST NETWORK BASED ON SERVICE WITHIN SECOND NETWORK

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handoff between coverage areas, and functions related to air interface communication.

In accordance with the air interface protocol, each coverage area may operate on one or more carrier frequencies and may define a number of air interface channels for carrying information between the base station and UEs. These channels may be defined in various ways, such as through frequency division multiplexing, time division multiplexing, and/or code-division multiplexing for instance.

Furthermore, when a cellular wireless network serves a UE over an air interface, the network may allocate various network resources to facilitate communication to and from the UE. By way of example, the network may allocate a particular air interface connection, such as a dedicated air interface traffic channel or a logical radio-connection identifier or radio bearer, for use to support air interface communications between the UE and a serving base station. Further, the network may allocate a backhaul bearer connection, such as a dedicated backhaul channel or logical backhaul bearer identifier, for use to support backhaul communications for the UE. Such a backhaul bearer connection may extend between the serving base station and a switch or gateway, for instance, or between various other network components. Still further, the network may allocate storage of one or more context record (e.g., bearer context records, session context records, or the like) for the UE, which may specify UE capability information, UE service authorizations, and UE bearer status.

OVERVIEW

In some areas, service providers may operate a hybrid wireless communication system that includes at least two radio access networks (RANs) and functionality to inter-work between the RANs. In such an arrangement, a UE may acquire connectivity with and be served by one of the RANs and may at some point transition to instead connect with and be served by another of the RANs. When this transition occurs, the first RAN may release certain network resources that the RAN had allocated for use to serve the UE, and the second RAN may instead allocate certain resources for use to serve the UE.

An example of such a hybrid wireless communication system is one that includes a first RAN providing LTE service to support mobile broadband communication and a second RAN providing legacy CDMA or GSM service to support traditional voice calls. In such a system, service providers may implement "circuit switched fallback" (CSFB) functionality, which allows UEs to operate by default on the LTE network and to conveniently transition over to the legacy CDMA or GSM network when necessary to place or receive traditional voice calls. Further, such CSFB fallback functionality may also be provided with respect to other combinations of air interface protocols.

With such an arrangement, a UE may connect with and be served by the LTE network over an LTE air interface, and the LTE network may thus allocate certain resources for the UE, such as a radio bearer, backhaul bearer, and context record for use in serving the UE. When the UE then seeks to place a voice call or the legacy CDMA or GSM network seeks to connect a voice call to the UE, the UE may then engage in signaling with the legacy network through the LTE network so as to set up the call and legacy network service and may then seamlessly transition over to connect with and be served with the call by the legacy network. In this process, the legacy network may newly assign certain bearer and context resources for the UE, and the LTE network may release the resources that it had allocated for the UE. In turn, once the UE finishes engaging in the CSFB call served by the legacy network, the UE may then transition back to being served by the LTE network. And in this process, the legacy network may release the resources that it had allocated for the UE, and the LTE network may newly assign resources for the UE.

In any cellular wireless system, it may take some time for a UE to initially acquire connectivity with a RAN, as the RAN works to allocate resources for the UE. When a UE first powers on in coverage of a RAN, this delay may pose no issue, as it may be viewed as a normal part of the power-on process. However, in a hybrid wireless communication system where a UE moves from being served by one network to being served by another network, it may be desirable to minimize this delay, to help provide a good user experience.

In a CSFB arrangement as described above, the transition from being served by the LTE network to being served with the call by the legacy network may be largely seamless, as the UE may engage in call setup signaling through the LTE network to set up the call with the legacy network service before then transitioning over to be served by the legacy network. However, when the CSFB call ends, there may be noticeable delay as the UE then transitions back to being served by the LTE network. In particular, if the LTE network had released the resources that it had allocated for the UE, the LTE network may need to go through a process of reallocating those resources, and the associated signaling between LTE network entities may take some time.

One solution to this problem may be to have the LTE network simply suspend, rather than release, the resources that the LTE network had allocated for the UE when the UE transitions to be served by the legacy network. That way, when the UE ends its CSFB call and returns to be served by the LTE network, the LTE network may simply resume use of the suspended resources, making the transition fairly seamless. For instance, the LTE network may simply maintain the UE's backhaul bearer but flag the bearer as being suspended, so that the LTE network would not send traffic over that bearer. Likewise, the LTE network may maintain the UE's stored context record but flag the UE's context as being suspended, so that the LTE network would not try to page the UE or to invoke certain other services for the UE. When the UE then returns to LTE service, the LTE network may then quickly resume those suspended resources without the need to re-establish them for the UE.

While suspending rather than releasing LTE resources may thus help to overcome the problem of delay in returning from CSFB service, one downside of this process is that it may tie up valuable LTE resources that are not currently being used to serve the UE and that instead could be used to serve other UEs. For example, due to license or capacity restrictions, an LTE network may have only a limited number of backhaul bearers that it could allocate, and the LTE network may have a limit on the number of context records that it can store. Further, increasing those limits may be costly or otherwise undesirable. If the LTE network suspends a UE's bearer when the UE transitions to engage in CSFB service, the LTE network would thus be tying up one of its limited number of bearers even though the LTE network is not currently serving the UE. Likewise, if the LTE network suspends a UE's context record when the UE transitions to engage in CSFB service, the LTE network would thus be tying up one of its allowed context records even though the LTE network is not currently serving the UE.

To help overcome this further issue, an LTE network may be configured to implement a resource-release timer when a UE transitions to be served by another network and the LTE network suspends resources that it had allocated for use to serve the UE. Such a timer could be configured to run for a period of time that is sufficient to cover the duration of typical CSFB service. In practice, the LTE network might thus be configured to start such a timer when the LTE network suspends resources for the UE and the UE transitions to engage in a CSFB call, and, if the UE has not yet returned to the LTE network, to then automatically release the suspended resources upon expiration of the timer.

Regardless of whether the LTE network implements such a resource-release timer, however, the theory of suspending LTE resources to facilitate return of a UE to LTE service may be based on an assumption that the UE can in fact return to LTE service when the UE finishes its CSFB call. Yet that assumption may not always be correct. For instance, while the UE is engaged in CSFB service in a legacy network, there is a chance that the UE may move into a coverage area of the legacy network where the LTE network does not also provide coverage. In that situation, if the UE finishes its CSFB call and then tries to move back into LTE service, the UE may be unable to do so. Consequently, the LTE network may continue to retain resources allocated for the UE (possibly for the remaining duration of a resource-release timer) even though the UE is in a location where the UE is unable be served by the LTE network.

Disclosed is a method and corresponding system to help overcome this additional issue or similar issues. In accordance with the disclosure, when a first access network has allocated a resource for use in serving a UE and the UE has then transitioned from being served by the first access network to being served by a second access network, a determination may be made that (i) the UE has then moved into particular coverage of the second access network and (ii) the first access network does not have a coverage area that corresponds with that particular coverage area of the second access network. In response to that determination, the first access network may then release the resource that it had allocated for use in serving the UE. In a scenario where the first access network had set a resource-release timer and is configured to normally release the resource upon expiration of the timer, the release in response to the determination may advantageously occur before the timer expires. The disclosed method and system may thereby help to better conserve possibly limited network resources.

Accordingly, disclosed is a method operable in a wireless communication system that includes a first access network and a second access network. In one respect, the method involves the first access network serving a UE and allocating a resource of the first access network for use in serving the UE. In turn, the method involves detecting a transition of the UE from being served by the first access network to being served by the second access network. And the method then involves, while the UE is served by the second access network as a result of the transition, (a) detecting handoff of the UE to a particular coverage area of the second access network, (b) responsive to detecting the handoff, making a determination that the first access network does not have a coverage area that corresponds with the particular coverage area of the second access network, and (c) responsive to the determination, releasing the resource.

Further, in another respect, the method may involve CSFB transition of the UE from the first access network to the second network. In particular, the method may involve the first access network serving the UE and allocating a resource of the first access network for use in serving the UE. And the method may then involve detecting a CSFB transition of the UE from being served by the first access network to being served by the second access network, and responsive to detecting the CSFB transition, starting a timer for release of the allocated resource, where the first access network is configured to release the allocated resource upon expiration of the timer.

In turn, the method may involve, after starting the timer but before the timer expires, detecting that the UE has moved into a coverage area of the second access network and managing release of the allocated resource in the first access network based on whether the first access network has coverage that corresponds with the coverage area of the second access network into which the UE moved. In particular, the method may involve, while the UE is being served by the second access network as a result of the CSFB transition, detecting movement of the UE to a particular wireless coverage area of the second access network. In turn, the method may involve, responsive to detecting the movement of the UE to the particular coverage area of the second access network, making a determination of whether the first access network provides wireless coverage that corresponds with that particular wireless coverage area of the second access network. And the method may then involve (i) if the determination is affirmative, allowing the timer to continue to run, but (ii) if the determination is negative, then, responsive to the determination, releasing the allocated resource without waiting for the timer to expire.

Still further, disclosed is a wireless communication system that includes a first RAN and a second RAN. The first RAN is configured to provide a plurality of first coverage areas in which to serve UEs according to a first air interface protocol, and the second RAN is configured to provide a plurality of second coverage areas configured to serve UEs according to a second air interface protocol. In the disclosed system, the first RAN is configured to detect transition of a UE from being served by the first RAN to being served by the second RAN, and, in response to detecting the transition, to start a timer for release of a resource of the first RAN that the first RAN had allocated for use in serving the UE. Further, the first RAN is configured to release the allocated resource in response to expiration of the timer, but the first RAN is also configured to release the allocated resource after starting the timer but before expiration of the timer in response to the UE moving into a particular one of the second coverage areas of the second RAN for which the first RAN does not have a corresponding first coverage area.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified block diagram of a network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
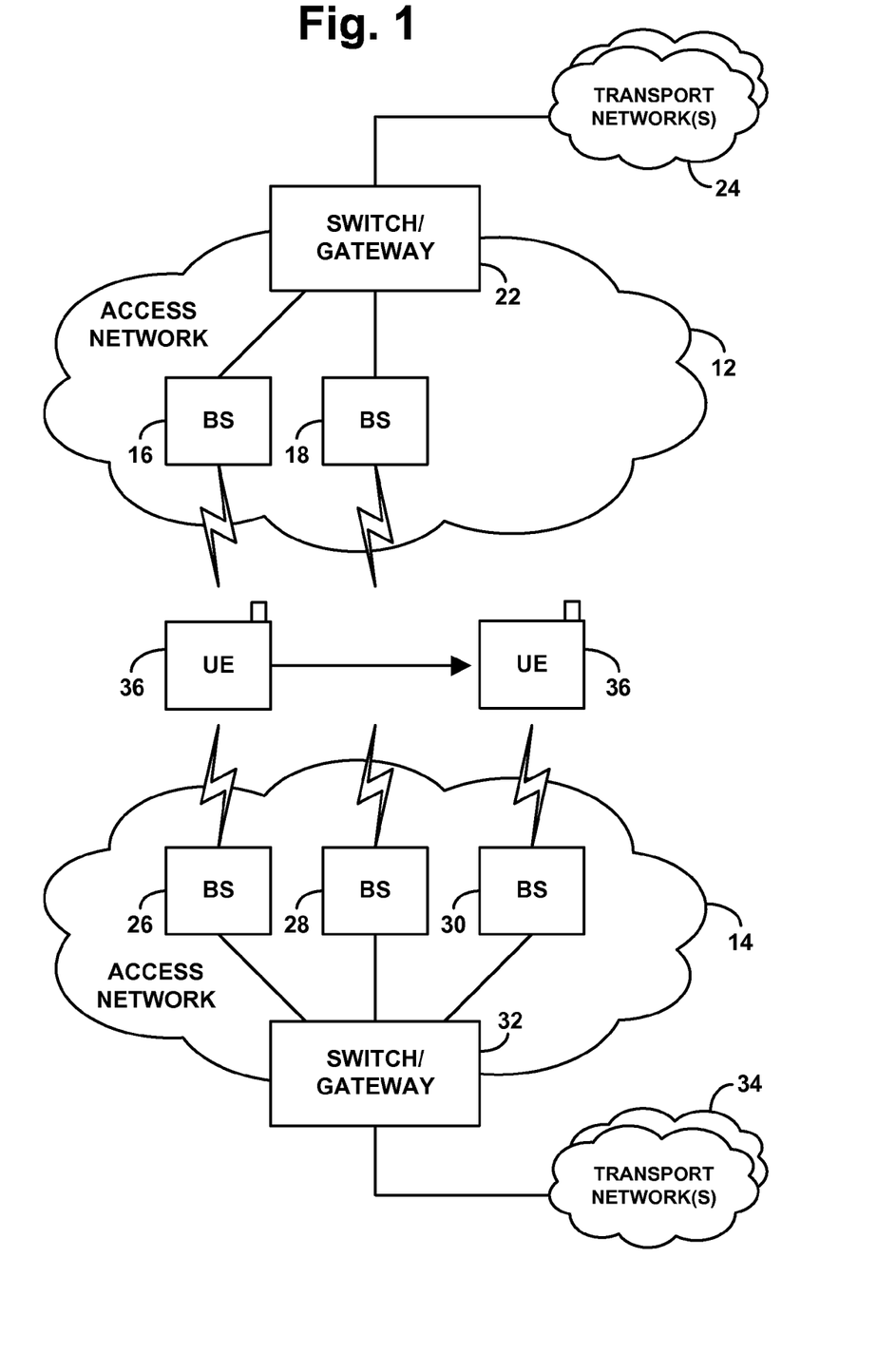
FIG. 1 is a simplified block diagram of a network arrangement in which aspects of the present disclosure can be implemented.

The arrangement of FIG. 1 includes by way of example two representative access networks 12, 14, each of which may function to provide UEs with air interface coverage and connectivity with one or more transport networks such as the PSTN and the Internet. As such, each access network may include multiple base stations that radiate to define coverage in which UEs may operate, and the base stations may be communicatively linked with one or more switches or gateways that provide connections in turn with one or more transport networks.

In the example arrangement shown, for instance, access network 12 includes two representative base stations 16 and 18, each having a communication link with a switch or gateway 22 that connects in turn with one or more transport networks 24. Further, access network 14 includes three representative base stations 26, 28, 30, each having a communication link with a switch or gateway 32 that connects in turn with one or more transport networks 34.

Numerous variations from this arrangement are possible, however. For instance, either access network may include a different number of base stations, though each access network preferably includes two or more base stations. Further, either access network may include more than one switch or gateway and may include various components between each switch or gateway and the transport network(s). Moreover, although a line is shown connecting each base station with the switch or gateway of its access network, the links between each base station and the switch or gateway may include various other components and could all be provided over a packet-switched network or other connection mechanism. Other variations are possible as well.

Each of these access networks may operate according to a respective air interface protocol, such as any of those noted above for instance. By way of example, network 12 might be an LTE network, and network 14 might be a CDMA or GSM network. Alternatively, both networks could operate according to the same air interface protocol. For instance, both networks could operate according to LTE, or both networks could operate according to CDMA or some other air interface protocol.

In practice, each of the illustrated base stations will be located at a particular location, and may radiate to provide one or more coverage areas. For simplicity in this disclosure, rather than depicting and discussing "coverage areas," the disclosure will refer primarily to the "base stations" that provide such coverage areas. Thus, reference to "base stations" may be considered to be reference to their coverage areas, and vice versa. Further, a particular coverage area such as a cell, cell sector, or combination of such areas, may have particular geographic scope, which could be represented by a circle, a polygon, or other means or by a point such as a centroid of the area for instance. Thus, reference to the location of a base station may be considered reference to the actual location of the base station itself and/or to a representative location of a coverage area provided by the base station, and vice versa.

Each base station, for instance, may be a macro-network base station positioned at a fixed location and providing fairly wide coverage from that location. Alternatively, any of the base stations may be a portable femtocell or small cell base station that is currently located at a particular location and may provide more restricted coverage from that location.

The location of each base station may be represented by geographic coordinates, such as latitude/longitude coordinates for instance, and the geographic coordinates of the various base stations may be recorded in a data table accessible to one or more other components of the system. In accordance with the present disclosure, such a table or associated data may correlate particular base stations of network 12 with particular base stations of network 14, based on proximity or co-location of the base stations and/or other factors, to establish for base stations of network 14 whether network 12 has corresponding base stations. For instance, the table may specify that base station 26 of network 14 is nearby or co-located with base station 26 of network 14, and thus that network 12 has a base station corresponding with base station 26 of network 14. Further, the table may specify that base station 28 of network 14 is nearby or co-located with base station 18 of network 12 and thus that network 12 has a base station corresponding with base station 28 of network 14. On the other hand, the table may not specify that network 12 has any base station nearby or co-located with base station 30 of network 14, and thus that network 12 does not have a base station corresponding with base station 30 of network 14. (In line with the note above, such correlation data may be keyed to the locations of the base stations themselves and/or to the locations where coverage of the base stations is deemed to exist.)

FIG. 1 further depicts a representative UE 36 moving from one location to another, and particularly moving from a location where the UE is within coverage of base stations 16 and 26 to a location where the UE is within coverage of base station 30. This UE may take various forms, examples of which include a cell phone, wirelessly-equipped personal computer or tablet computer, in-vehicle communication module, wireless tracking device, or other type of user equipment device now known or later developed.

In practice with this arrangement, UE 36 may have been registered with and served by network 12, and network 12 may have allocated a resource of network 12 for use in serving the UE. For instance, network 12 may have allocated a bearer, a context record, and/or other resource of network 12 for use in serving the UE. While the UE was then served by base station 16 of network 12, the UE may then have transitioned from being served by network 12 to being served by network 14 and may be served by corresponding base station 26 of network 14, and network 12 may have suspended the allocated resource and possibly started a resource-release timer. When served by network 14, the UE may then engage in a call (e.g., voice call, voice over Internet Protocol (VoIP) call, data communication session, or the like) served by network 14. For instance, the UE may engage in a call with a remote entity (not shown) on a representative transport network 34.

Further, as the UE engages in this call, the UE may move throughout coverage of network 14 and may thus be served by various ones of the illustrated base stations of network 14. For instance, the UE may begin the call while served by base station 26, the UE may hand off mid-call from being served by base station 26 to being served by base station 28, and the UE may then hand off mid-call from being served by base station 28 to being served by base station 30. The UE may then end the call while being served by base station 30. As the UE hands off from being served by one base station of network 14 to being served by another base station of network 14, an entity of network 14, such as switch or gateway 32, may keep a record of the handoff and of the base station that is currently serving the UE (and thus the coverage area of network 14 to which the UE has moved).

In line with the present disclosure, when the UE is served by network 14 and hands off or otherwise moves to be served by a new base station (e.g., a new coverage area) of network 14, a determination may be made as to whether network 12 has a base station (e.g., coverage area) corresponding with the new base station of network 14 that is now serving the UE. Based on whether network 12 has such a corresponding base station or not, network 12 may then either (i) responsively release the resource that it had allocated for serving the UE or (ii) keep the resource in suspended (but still allocated) state, possibly waiting for expiration of the resource-release timer.

In practice, for instance, the switch or gateway 32 of network 14 may respond to the UE's handoff from base station 26 to base station 28 by performing a lookup in correlation data as described above in order to determine whether network 12 has a base station corresponding with new serving base station 28 of network 14, and the switch or gateway 32 may transmit to switch or gateway 22 of network 12 an indication of that determination. Alternatively, switch or gateway 32 of network 14 may respond to the UE's handoff from base station 26 to base station 28 by signaling to an intermediary between the access networks or to switch or gateway 22 of network 12 to indicate that the UE has moved into coverage of base station 28 of network 14. Such an intermediary may then perform a lookup in correlation data as described above in order to determine whether network 12 has a base station corresponding with new serving base station 28 of network 14 and may provide an indication accordingly to the switch or gateway 22 of network 12. Or the switch or gateway 22 of network 12 may perform such a lookup in the correlation data to determine whether network 12 has a base station corresponding with the new serving base station 28 of network 12. Still alternatively, one or more other entities in the system could be involved in or responsible for making this determination and/or notifying one or more other entities of network 12.

In this case, the determination based on the correlation data or other analysis would be that network 12 does in fact have a base station corresponding with the new serving base station 28 of network 14. Namely, network 12 has base station 18 that corresponds with new serving base station 28 of network 14. Consequently, in line with the present disclosure, network 12 may responsively retain the allocated resource in suspended state, possibly until expiration of a resource-release timer, to allow for efficient return of the UE to service of network 12.

On the other hand, when the UE then hands off from base station 28 of network 14 to base station 30 of network 14, switch or gateway 32 of network 12 may detect that handoff, and that switch or gateway and/or one or more other entities in the system may make a determination, by reference to the correlation data or through other analysis, that network 12 does not have a base station corresponding with the new serving base station 30 of network 14. In this case, in line with the present disclosure, network 12 may then respond to the determination by releasing the resource that had been allocated for use in serving the UE, rather than waiting for expiration of a resource-release timer or other trigger for release of the resource. For instance, if the allocated resource was a bearer, network 12 may release the bearer. Or if the allocated resource was a context record, network 12 may delete the context record.

Figure 2:
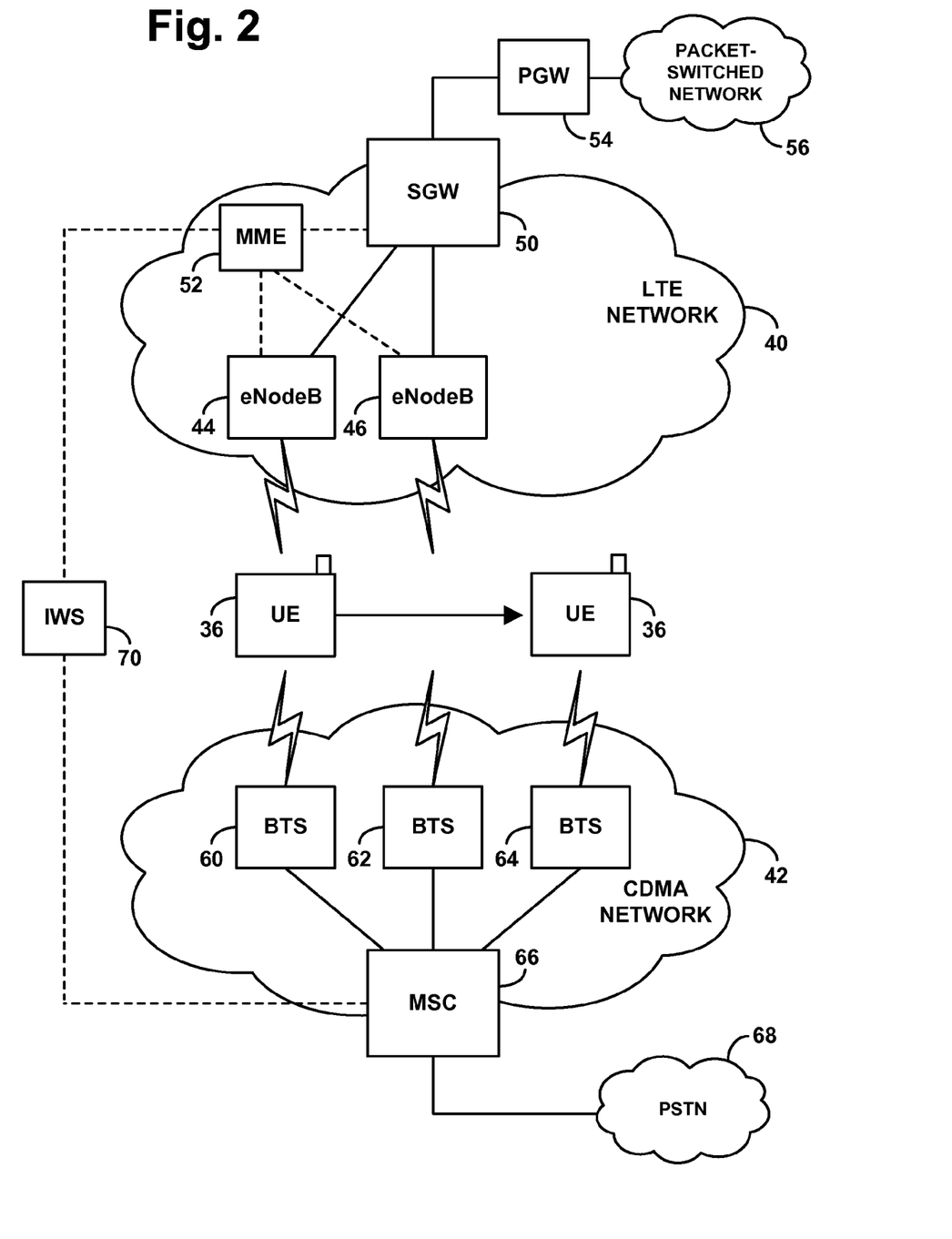
FIG. 2 is a simplified block diagram of a more specific network arrangement in which aspects of the disclosure can be implemented.

FIG. 2 is next another simplified block diagram illustrating more specifically a particular example arrangement in which this process can be implemented. In particular, FIG. 2 depicts a hybrid LTE/CDMA wireless communication system, including an LTE network 40 and a circuit-switched CDMA network 42, arranged to support CSFB operation. In such an arrangement, the present method can help to avoid having the LTE network retain in suspended state a resource for serving a UE if the UE is engaged in CSFB service and moves into CDMA coverage where the LTE network does not have corresponding LTE coverage.

In the arrangement of FIG. 2, the LTE network 40 is shown including two representative LTE base stations 44, 46 known as eNodeBs. The eNodeBs are then each communicatively linked with a serving gateway (SGW) 50 and further with a controller 52 known as a mobility management entity (MME), and the MME is communicatively linked with the SGW. In addition, SGW 50 is further shown being communicatively linked with a packet gateway (PGW) 54, which provides connectivity with a packet-switched network 56 such as the Internet for instance.

In FIG. 2, the links between the eNodeBs and the SGW are shown as solid lines to conceptually represent links used to carry bearer traffic, and the links between the eNodeBs and the MME and between the MME and the SGW are shown as dashed lines to conceptually represent links used to carry signaling traffic. In practice, all of these links may be provided over a common packet-switched network or the like or in any other form.

With this arrangement, when a UE enters into coverage of a given eNodeB, the UE may normally transmit to the eNodeB an LTE attach request message seeking to be served by the eNodeB, and the eNodeB would forward the attach request to the MME. In response, the MME may then create an evolved packet system (EPS) bearer identity for the UE, the MME would establish a context record for the UE, and the MME would send to the SGW a create-session request message specifying the bearer identity. The SGW may then create an entry for the UE in an EPS bearer table that the SGW maintains, designating an address or other identifier of the serving eNodeB, and would send a create-session response to the MME. And the MME may responsively send to the eNodeB an attach-accept message providing the bearer ID (and perhaps providing the address or other identifier of the SGW), and the eNodeB may send a corresponding attach-accept message to the UE and allocate a radio bearer identity for use by the UE.

CDMA network 42, on the other hand, is shown including three representative base stations 60, 62, 64 known as base transceiver stations (BTSs), all of which are communicatively linked with a representative switch 66 known as a mobile switching center (MSC). MSC 66 then provides connectivity with the PSTN 68 and functions as a controller of the CDMA network 42. In practice, the communication links between the illustrated BTSs and the MSC may include various other entities, such as one or more base station controllers (BSCs) or radio network controllers (RNCs) for instance. Further, other variations are possible as well.

With the arrangement shown, in normal practice, when a UE enters into coverage of a given BTS, the UE may transmit to the BTS a registration message seeking to be served by the BTS. Once registered, the UE may then operate in an idle mode in which the UE periodically reads a paging channel from that BTS in search of any relevant page messages and the UE also scans for better coverage for possible idle handoff to another base station. When the UE seeks to initiate a call on the PSTN, the UE may then transmit over the air to its serving BTS an origination request, the BTS may pass the request to the MSC 66, and the MSC may set up the call. Further, the BTS may assign a CDMA air interface traffic channel for use by the UE to engage in the call, thus transitioning the UE to an active mode. Likewise, when the MSC has an incoming call to connect to the UE, the MSC may direct the currently serving BTS to page the UE and, upon receipt of a page response from the UE, may connect the call through the BTS to the UE.

As noted, the system of FIG. 2 is arranged to support CSFB operation. As such, the system further includes an intermediary known as an interworking server (IWS) 70, which has a signaling communication link with both the MSC 66 of the CDMA network 42 and the MME 52 of the LTE network 40. (As with other communication links described herein, although these links are shown as direct links, they may include one or more intervening elements or functions as well. Further, although the IWS is shown as a discrete entity, the IWS 70 could be provided as a function of the MSC 66 or of one or more other entities.) In practice, for instance, the IWS 70 may conveniently facilitate setup of CDMA calls for a UE while the UE is served by the LTE network, so that the UE can then seamlessly transition from being served by the LTE network to engaging in the calls served by the CDMA network. In particular, certain call setup signaling that would normally flow over the CDMA air interface between the UE and a CDMA BTS will instead flow over the LTE air interface between the UE and an LTE eNodeB, and that signaling will pass between the eNodeB and the MME 52, between the MME 52 and the IWS 70, and between the IWS 70 and the MSC 66.

For instance, when the CDMA network has a voice call to connect to the UE, the CDMA network may signal through the IWS to the LTE network to cause the LTE network to transmit a CSFB page message to the UE over the LTE air interface, which may cause the UE to transmit to its serving eNodeB a CSFB extended service request message. Likewise, if the UE has a voice call to place, the UE may autonomously send a CSFB extended service request message to its serving eNodeB.

Responsive to the CSFB extended service request message, the eNodeB may then inform the UE of CDMA network operational parameters and may direct the UE to scan for CDMA coverage. Thus, the UE may then scan for CDMA coverage and may transmit to the eNodeB a CDMA origination request, which the eNodeB may tunnel to the MME, the MME may tunnel to the IWS, and the IWS may tunnel to the MSC. The MSC may then direct the detected CDMA BTS to assign an air interface traffic channel for use by the UE to engage in the call, and the MSC may return to the IWS for transmission ultimately to the UE a traffic channel assignment message directing the UE to use the assigned CDMA traffic channel. The UE may the transition to engage in the call over CDMA, served by the detected CDMA BTS using the assigned CDMA traffic channel.

In this process, when the eNodeB transmits the CDMA traffic channel assignment message to the UE, or at another point in anticipation of, during, or in response to transition of the UE from being served by the LTE network to being served with the call by the CDMA network, the eNodeB may then transmit to the MME a context release request message specifying CSFB as the cause. However, rather than releasing a bearer or context record that the LTE network had allocated for use in serving the UE, the MME may responsively suspend one or more such resources. For instance, to suspend a bearer that had been allocated for the UE, the MME may update its stored context record for the UE to flag or otherwise indicate that the bearer is suspended, the MME may responsively transmit to the SGW a suspend bearer request to cause the SGW to likewise update its context record for the UE to flag or otherwise indicate that the bearer is suspended, and the SGW may do so. Further, this same process may effectively suspend one or more context records that the LTE network had allocated for use in serving the UE, by flagging or otherwise updating those context records to indicate that the UE is not currently being served by the LTE network.

By suspending these resources in this manner or the like, the SGW may then avoid trying to transmit incoming packet-data to the eNodeB for transmission to the UE, and the SGW may avoid signaling to the MME to trigger paging of the UE over LTE. Further, the MME may thereby avoid paging the UE or taking certain other actions with respect to service of the UE. Yet each such resource would remain allocated for serving the UE, to facilitate resuming use of the resource when the UE finishes its CSFB call and returns to LTE service.

In addition, when or in association with suspending an LTE resource in such a process, the MME may start a resource-release timer for the suspended resource, and the MME may be configured to respond to expiration of that timer by releasing the resource or invoking release of the resource. For instance, the MME may set and start such a timer for a period that is on the order of minutes or hours. Upon expiration of the timer, if the UE has not yet returned to LTE and the LTE network has thus not yet resumed use of the allocated resource, the MME may then release the resource. For example, if the MME had suspended a bearer that was allocated for the UE, the MME may then transmit a release bearer request to each of the eNodeB and SGW to trigger release (i.e., tearing down) of the bearer connection between the SGW and the eNodeB by deleting or otherwise clearing the bearer entries or context records that had identified the bearer and facilitated exchange of bearer traffic for the UE. Further, if the MME had stored a context record for the UE, the MME may delete that context record. This release process may result in implicitly detaching the UE from the LTE network, by clearing the resources in the LTE network that had been allocated to serve the UE.

In line with the present disclosure, while the UE is being served by the CDMA network 42 as a result of its CSFB transition, any of various entities in illustrated system may function to detect when the UE moves to new coverage of the CDMA network, to make a determination of whether the LTE network has coverage corresponding with that new coverage of the CDMA network, and, based on that determination, to then either (i) retain an LTE resource in suspended state for the UE, waiting until expiration of the resource-release timer before releasing the resource, or (ii) release the LTE resource early, without waiting for expiration of the resource-release timer.

To facilitate this, as discussed above, one or more entities in the system may include or have access to correlation data that correlates coverage of the CDMA network with coverage of the LTE network. In particular, the correlation data may indicate for each of various coverage areas of the CDMA network whether the LTE network provides coverage such that a UE served by the CDMA network in that coverage area could transition from that CDMA service to be served by the LTE network. By way of example, this data could be established through manual engineering input and/or automatically established, and the data could be maintained by MSC 66, IWS 70, or MME 52, or elsewhere.

In an example implementation, when the UE has transitioned from being served by LTE network 12 to being served by the CDMA network 42, if the UE hands off from one CDMA coverage area to another, MSC 66 may detect the handoff and may responsively signal to IWS 70, and IWS 70 may then signal in response to MME 52, providing MME 52 with an indication of the new CDMA coverage area and an identifier of the UE. For instance, the IWS may send to the MME a new message or a new information element in an existing status message, specifying an identifier of the CDMA BTS to which the UE handed off and specifying an international mobile subscriber identifier (IMSI) of the UE.

Upon receipt of this indication of UE movement to the new CDMA coverage area, MME 52 may then refer to the correlation data to make a determination of whether LTE network 40 provides coverage corresponding with that CDMA coverage area. In the arrangement of FIG. 2, if the UE moved from coverage of BTS 60 to coverage of BTS 62, for instance, the determination may be affirmative, as the LTE network provide corresponding coverage provided by eNodeB 46. Whereas, if the UE moved from coverage of BTS 62 to coverage of BTS 64, then the determination may be negative, as the LTE network does not provide corresponding coverage.

Alternatively, the IWS could be the entity that makes the determination of whether the LTE network provides corresponding coverage, by performing a similar lookup in the correlation data for instance. The IWS may then signal to the MME providing the MME with an indication of the determination. For simplicity, the IWS in this arrangement might signal to the MME only if the determination is that the UE has moved into CDMA coverage for which the LTE network does not have corresponding coverage.

Through this or another process, if the determination is that the UE has moved into coverage of the CDMA network for which the LTE network has corresponding coverage, then the MME may continue to allow the resource-release timer to run, and upon expiration of the resource-release timer may then release the resource that had been allocated for the UE but then suspended. On the other hand, if the determination is that the UE has moved into coverage of the CDMA network for which the LTE network does not provide corresponding coverage, then the MME may respond to the determination by releasing the suspended resource early, i.e., without waiting for the timer to expire.

Alternative, in this latter scenario (where the determination is that the UE has moved into coverage of the CDMA network for which the LTE network does not provide corresponding coverage), the MME may then start a short supplemental timer to give the UE some time to possibly then move again into a CDMA coverage area for which the LTE network does provide corresponding coverage before the MME invokes release of the suspended resource. Through the same process described above, if the MME then determines that the UE moves into such a CDMA coverage area before expiration of that supplemental timer, then the MME may retain allocation of the suspended resource. But if the supplemental timer expires without the MME determining that the UE has moved into such a CDMA coverage area, then the MME may still responsively release the suspended resource early, i.e., without waiting for the primary timer (the above discussed timer) to expire.

Figure 3:
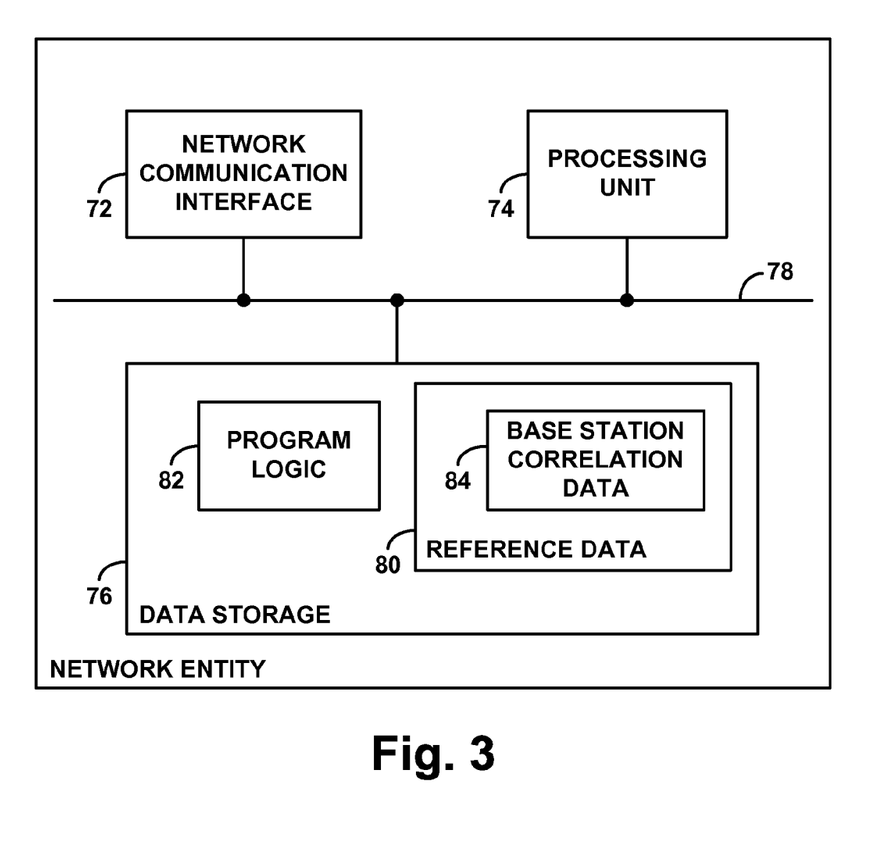
FIG. 3 is a simplified block diagram of a network entity operable in the arrangement of FIGS. 1 and 2.

FIG. 3 is a simplified block diagram depicting components that may be included in a representative network entity, such as MME 52, to facilitate these functions. As shown, the entity may include a network communication interface 72, a processing unit 74, and non-transitory data storage 76, all of which may be communicatively linked together by a system bus, network, or other communication mechanism 78.

If the network entity is MME 52, network communication interface 72 may function to facilitate communication with various other entities such as the eNodeBs 44, 46, the SGW 50, and the IWS 70. As such, the interface 72 may include one or more network interface modules, such as Ethernet network interface modules for instance or may take any of a variety of other forms, supporting wireless and/or wired communication with these and other components.

Processing unit 74 may then comprise one or more general purpose processors (such as microprocessors) and/or one or more special purpose processors (e.g., application specific integrated circuits). And data storage 76 may comprise one or more volatile and/or non-volatile storage components, such as optical, magnetic, or flash storage, and may be integrated in whole or in part with processing unit 74. As shown, data storage 76 may include reference data 80 and program logic 82. Reference data 80 may comprise correlation data 84 such as that noted above. And program logic may comprise program instructions that are executable or interpretable by processing unit 74 to carry out various functions described herein, such as (a) detecting (e.g., being informed or otherwise determining) that, while the UE is served by CDMA network 42 as a result of CSFB transition from LTE network 40, the UE has moved into a particular coverage area of the CDMA network, (b) responsively making a determination of whether the LTE network provides coverage corresponding with that particular CDMA coverage area, and (c) based on the determination, either (i) retaining allocation of the suspended resource, possibly until a resource-allocation timer expires or (ii) responding to the determination by releasing the suspended resource.

Figure 4:
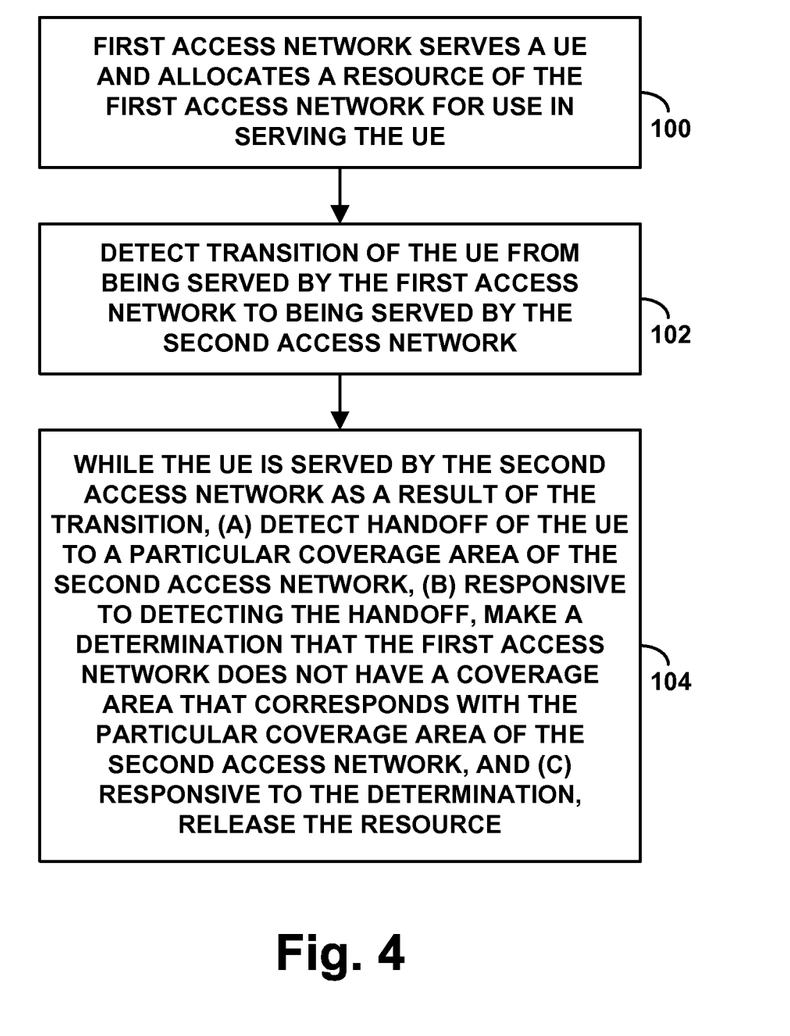
FIG. 4 is a flow chart depicting a method that can be carried out in accordance with the present disclosure.

FIG. 4 is next a flow chart depicting a method that can be carried out in an example wireless communication system that includes a first access network and a second access network. In practice, the system could be arranged as shown in FIG. 1 or FIG. 2. But the functions depicted and described could be applied in other contexts as well.

As shown in FIG. 4, at block 100, the method involves the first access network serving a UE and allocating a resource of the first access network for use in serving the UE. At block 102, the method then involves detecting a transition of the UE from being served by the first access network to being served by the second access network. And at block 104, the method then involves while the UE is served by the second access network as a result of the transition, (a) detecting handoff of the UE to a particular coverage area of the second access network, (b) responsive to detecting the handoff, making a determination that the first access network does not have a coverage area that corresponds with the particular coverage area of the second access network, and (c) responsive to the determination, releasing the resource.

In line with the discussion above, the first network could be an LTE network and the second network could be a fallback network such as a CDMA or GSM network for instance. In that scenario, the act of detecting transition of the UE from being served by the first access network to being served by the second access network could be done by the MME receiving a signal (e.g., from an eNodeB serving the UE) that indicates the UE is or has moved to the fallback network to engage in a CSFB call, or that indicates or is associated with setup of such a CSFB transition, whether the transition is about to occur, is occurring, or has just occurred for instance.

In turn, the act of detecting handoff of the UE to a particular coverage area of the second access network could be done by an entity of the second access network such as an MSC that may be involved with the handoff or otherwise aware of the handoff, or could be done by the MME or other entity of the first access network receiving a signal indicating that the UE has moved into particular a coverage area of the second access network, regardless of whether the indication indicates what coverage area the UE moved from. Other arrangements are possible as well.

The act of then making the determination that the first access network does not have a coverage area that corresponds with the particular coverage area of the second access network may then be done by various entities as noted above. For instance, this could be done by an IWS or by the MME. And in turn the act of responding to that determination by releasing the resource could be done by the MME or other entity of the first access network.

Furthermore, in line with the discussion above, the method may also involve, responsive to detecting the transition of the UE from being served by the first access network to being served by the second access network, starting a timer for release of the allocated resource, with the first access network being configured to release the allocated resource upon expiration of the timer. For instance, an MME or other entity of the first access network could do this. Further, the act of detecting the handoff of the UE to the particular coverage area of the second access network may occur after starting the timer. And the act of releasing the resource in response to the determination may involve releasing the resource before the timer expires, instead of allowing the timer to expire and releasing the resource in response to expiration of the timer.

Moreover, in line with the discussion above, the method may additionally involve maintaining correlation data that correlates coverage areas of the first access network with coverage areas of the second access network. And in that case, the act of making the determination that the first access network does not have a coverage area that corresponds with the particular coverage area of the second access network may involve performing a lookup in the correlation data to make the determination.

Also in line with the discussion above, the wireless communication system may include an intermediary, such as an IWS, for passing signaling between the first access network and the second access network. And in that case, the act of making the determination could be done by the intermediary, and the method could additionally involve providing from the intermediary to a controller of the first access network, such as an MME, an indication of whether the first access network has a coverage area that corresponds with the particular coverage area of the second access network.

Alternatively, the first access network may include a controller, such as an MME, that controls allocation and release of the resource as described by example above, in which case the act of making the determination could be done by the controller. Further, the controller may receive from the second access network, possibly through an intermediary such as an IWS, and possibly in response to the handoff occurring, an indication of the particular coverage area.

As further discussed above, the act of making the determination that the first access network does not have a coverage area that corresponds with the particular coverage area of the second access network may involve determining that the first access network does not have a coverage area that corresponds geographically with the particular coverage area of the second access network. For instance, the correlation data may correlate coverage areas based on whether they are deemed sufficiently geographically close, overlapping, co-located, or otherwise corresponding such that the UE served by a coverage area of the second access network could transition to be served by a corresponding coverage area of the first access network.

Figure 5:
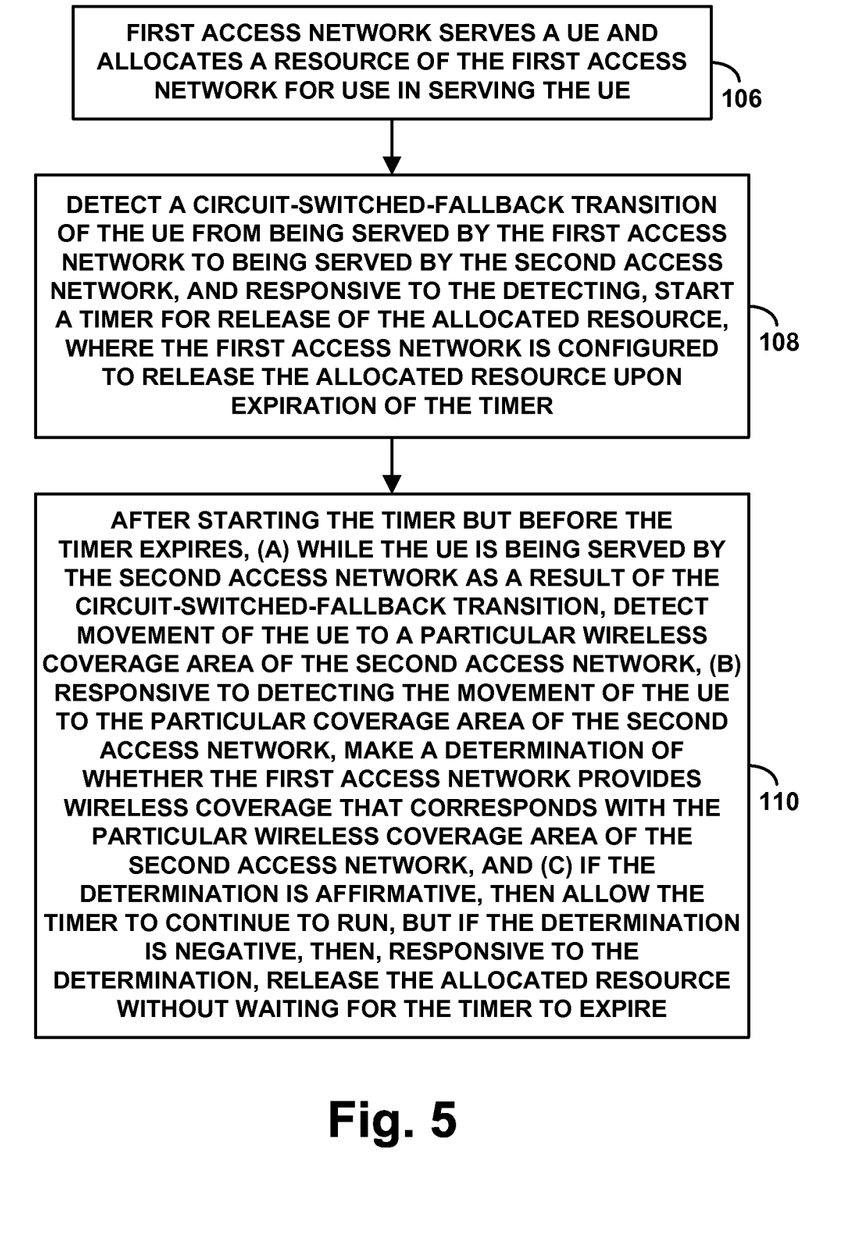
FIG. 5 is another flow chart depicting a method that can be carried out in accordance with the present disclosure.

FIG. 5 is next another flow chart depicting a method that can be carried out in an example wireless communication system that includes a first access network and a second access network. Again, the system could be arranged as shown in FIG. 1 or FIG. 2, but the functions depicted and described could be applied in other contexts as well.

As shown in FIG. 5, at block 106, the method involves the first access network serving a UE and allocating a resource of the first access network for use in serving the UE. At block 108, the method then detecting a circuit-switched-fallback transition of the UE from being served by the first access network to being served by the second access network, and responsive to the detecting, starting a timer for release of the allocated resource, where the first access network is configured to release the allocated resource upon expiration of the timer.

At block 110, the method then involves, after starting the timer but before the timer expires, (a) while the UE is being served by the second access network as a result of the circuit-switched-fallback transition, detecting movement of the UE to a particular wireless coverage area of the second access network, (b) responsive to detecting the movement of the UE to the particular coverage area of the second access network, making a determination of whether the first access network provides wireless coverage that corresponds with the particular wireless coverage area of the second access network, and (c) if the determination is affirmative, then allowing the timer to continue to run, but if the determination is negative, then, responsive to the determination, releasing the allocated resource without waiting for the timer to expire.

Exemplary embodiments have been described above. Those skilled in the art will understand, however, that changes and modifications may be made to these embodiments without departing from the true scope and spirit of the invention.

We claim:

1. In a wireless communication system comprising a first access network and a second access network, a method comprising, in order:
the first access network serving a user equipment device (UE) and allocating a resource of the first access network for use in serving the UE;
detecting a transition of the UE from being served by the first access network to being served instead by the second access network, wherein, when the UE is served by the second access network, the UE engages in a call served by the second access network; and
when the UE is served by the second access network as a result of the transition and is engaged in the call served by the second access network, (a) detecting handoff of the UE to a particular coverage area of the second access network, the handoff being from another coverage area of the second network to the particular coverage area of the second network, (b) responsive to detecting the handoff, making a determination that the first access network does not have a coverage area that corresponds with the particular coverage area of the second access network, and (c) responsive to the determination, releasing the resource,
the method further comprising maintaining correlation data that indicates for each of various coverage areas of the first access network whether the second access network provides corresponding coverage, wherein making the determination that the first access network does not have a coverage area that corresponds with the second coverage area of the second access network comprises performing a lookup in the correlation data to make the determination.

2. The method of claim 1, further comprising:
responsive to detecting the transition of the UE from being served by the first access network to being served by the second access network, starting a timer for release of the allocated resource, wherein the first access network is configured to release the allocated resource upon expiration of the timer,
wherein releasing the resource in response to the determination comprises releasing the resource before the timer expires, instead of allowing the timer to expire and releasing the resource in response to expiration of the timer.

3. The method of claim 2, wherein detecting the handoff of the UE to the particular coverage area of the second access network occurs after starting the timer but before the timer expires.

4. The method of claim 1, wherein the wireless communication system includes an intermediary for passing signaling between the first access network and the second access network, wherein making the determination is done by the intermediary, and wherein the method further comprises:
providing from the intermediary to a controller of the first access network an indication of whether the first access network has a coverage area that corresponds with the second coverage area of the second access network.

5. The method of claim 1, wherein the first access network includes a controller that controls allocation and release of the resource, and wherein making the determination is done by the controller.

6. The method of claim 5, further comprising the controller receiving from the second access network an indication of the particular coverage area, the indication being provided in response to the handoff.

7. The method of claim 1, wherein making the determination that the first access network does not have a coverage area that corresponds with the particular coverage area of the second access network comprises determining that the first access network does not have a coverage area that corresponds geographically with the particular coverage area of the second access network.

8. The method of claim 1, wherein detecting the handoff of the UE to the particular coverage area of the second access network comprises the second access network detecting the handoff of the UE to the particular coverage area.

9. The method of claim 1, wherein detecting the handoff of the UE to the particular coverage area of the second access network comprises the first access network receiving an indication of the handoff of the UE to the particular coverage area of the second access network.

10. The method of claim 1, wherein the resource of the first access network comprises a bearer for carrying communications between the UE and a transport network, and wherein releasing the resource comprise tearing down the bearer.

11. The method of claim 1, wherein the resource of the first access network comprises a UE context record stored by the first access network, the UE context record specifying capability information of the UE and specifying bearer status of the UE, and wherein releasing the resource comprises deleting the UE context record.

12. The method of claim 1, further comprising:
in response to detecting the transition of the UE from being served by the first access network to being served by the second access network, the first access network suspending but not yet releasing the resource.

13. The method of claim 1, wherein detecting the transition of the UE from being served by the first access network to being served by the second access network comprises detecting circuit-switched-fallback transition of the UE.

14. In a wireless communication system comprising a first access network and a second access network, a method comprising, in order:
the first access network serving a user equipment device (UE) and allocating a resource of the first access network for use in serving the UE;
detecting a circuit-switched-fallback transition of the UE from being served by the first access network to instead being served by the second access network, wherein, when the UE is served by the second access network, the UE engages in a call served by the second access network;
responsive to the detecting, the first access network starting a timer for release of the allocated resource; and
after starting the timer but before the timer expires, (a) when the UE is being served by the second access network as a result of the circuit-switched-fallback transition and is engaged in the call served by the second access network, detecting movement of the UE to a particular wireless coverage area of the second access network, wherein the movement is from another coverage area of the second access network to the particular coverage area of the second access network, (b) responsive to detecting the movement of the UE to the particular wireless coverage area of the second access network, making a determination of whether the first access network provides wireless coverage that corresponds with the particular wireless coverage area of the second access network, and (c) if the determination is affirmative, then the first access network allowing the timer to continue to run and waiting for the timer to expire to then release the allocated resource, but if the determination is negative, then, responsive to the determination, the first access network releasing the allocated resource without waiting for the timer to expire,
the method further comprising maintaining correlation data that indicates for each of various coverage areas of the first access network whether the second access network provides corresponding coverage, wherein making the determination of whether the first access network provides wireless coverage that corresponds with the particular wireless coverage area of the second access network comprises performing a lookup in the correlation data to make the determination.

15. A wireless communication system comprising:
a first radio access network (RAN) configured to provide a plurality of first coverage areas in which to serve user equipment devices (UEs) according to a first air interface protocol; and
a second RAN configured to provide a plurality of second coverage areas configured to serve UEs according to a second air interface protocol,
wherein, the first RAN is configured to:
(i) detect transition of a UE from being served by the first RAN to being served instead by the second RAN,
(ii) in response to detecting the transition, start a timer for release of a resource of the first RAN that the first RAN had allocated for use in serving the UE,
(iii) in response to expiration of the timer, release the allocated resource, and
(iv) when the UE is served by the second RAN as a result of the transition and is engaged in a call served by the second RAN, (a) make a determination that the UE moves into a particular one of the second coverage areas of the second RAN and that the first RAN does not have a first coverage area corresponding with the particular second coverage area, and (b) responsive to the determination, release the allocated resource after starting the timer but before expiration of the timer,
wherein the move of the UE is from another one of the second coverage areas to the particular one of the second coverage areas, and
wherein determining that the first RAN does not have a first coverage area corresponding with the particular second coverage area comprises performing a lookup in correlation data, wherein the correlation data indicates for each of various coverage areas of the first RAN whether the second RAN provides corresponding coverage.

16. The wireless communication system of claim 15, wherein first RAN includes a controller configured (a) to receive from the second RAN an indication of movement of the UE to the particular one of the second coverage areas of the second RAN, (b) to respond to the indication by determining whether the first RAN has a first coverage area corresponding with the particular second coverage area, and (c) to respond to the determination being that the first RAN does not have a first coverage area corresponding with the particular second coverage area by releasing the resource even though the timer has not yet expired.

17. The wireless communication system of the claim 15, wherein the controller is a mobility management entity (MME), and wherein the transition of the UE from being served by the first RAN to being served instead by the second RAN comprises a circuit-switched-fallback transition.

* * * * *